US006970500B1

(12) United States Patent
Sanders

(10) Patent No.: US 6,970,500 B1
(45) Date of Patent: Nov. 29, 2005

(54) METHOD FOR DETERMINING DATA BIT TRANSITIONS FOR A LOW LEVEL SPREAD SPECTRUM SIGNAL

(75) Inventor: Jeffrey D. Sanders, San Jose, CA (US)

(73) Assignee: Trimble Navigation Limited, Sunnyvale, CA (US)

(*) Notice: Subject to any disclaimer, the term of this patent is extended or adjusted under 35 U.S.C. 154(b) by 795 days.

(21) Appl. No.: 09/919,217

(22) Filed: Jul. 31, 2001

(51) Int. Cl.[7] ............................................. H04B 1/69
(52) U.S. Cl. ................................................... 375/150
(58) Field of Search ............................... 375/226–228, 375/242–245, 247, 286, 289, 290, 254, 316, 375/317, 354, 360, 359, 371, 377, 824, 100, 375/150, 147, 140, 130; 324/76.11–76.12, 324/76.38, 0.52, 76.77, 0.82; 708/494, 490, 708/200, 800, 801, 823, 824, 100

(56) References Cited

U.S. PATENT DOCUMENTS 5,200,979 A * 4/1993 Harris .......................... 375/292

6,075,987 A     6/2000 Camp et al. ................. 455/427
6,407,699 B1 *  6/2002 Yang ....................... 342/357.12

* cited by examiner

Primary Examiner—Mohammed Ghayour
Assistant Examiner—Pankaj Kumar
(74) Attorney, Agent, or Firm—Menlo Patent Agency LLC; David R. Gildea

(57) ABSTRACT

Apparatus and methods for determining the timing of the data bit transitions. "N" assumptions of data bit transitions are used for determining N integrations of an incoming spread signal for data bit time periods where N is the data bit time period divided by the code time period. In a first variation, the N assumptions use N start times separated by code time periods. In a second variation, the N assumptions use N sign inversion times separated by code time periods. In either variation the unsigned values of the N integrations, respectively, may be combined for several data bit time periods. The assumed transition timing that results in the strongest of the N integrations is indicative of the timing of the data bit transitions.

20 Claims, 7 Drawing Sheets

METHOD FOR DETERMINING DATA BIT TRANSITIONS FOR A LOW LEVEL SPREAD SPECTRUM SIGNAL

BACKGROUND OF THE INVENTION

1. Field of the Invention

The invention relates generally to apparatus and methods for receiving low level direct sequence spread spectrum signals and more particularly to an apparatus and method for determining the timing of the data bit transitions that avoids the nullifying effect of data bit inversions when accumulating the signal over long time periods.

2. Description of the Prior Art

Direct sequence spread spectrum signals are used for code division multiple access (CDMA) radio communication, and global positioning (GPS) and global navigation satellite (GLONASS) location systems. As an example, the global positioning system is a system using GPS satellites for broadcasting GPS signals having information for determining location and time. Each GPS satellite broadcasts a GPS signal having 20 milliseconds (ms) GPS data bits modulated by a repeating 1 ms pseudorandom noise (PRN code having 1023 bits or chips. The PRN code for each GPS satellite is distinct, thereby enabling a GPS receiver to distinguish the GPS signal from one GPS satellite from the GPS signal from another GPS satellite. The 20 ms GPS data bits are organized into frames of fifteen hundred bits. Each frame is subdivided into five subframes of three hundred bits each.

Typically, when the GPS receiver is first turned on, it knows its own approximate location, an approximate clock time, and almanac or ephemeris information for the locations-in-space of the GPS satellites as a function of clock time. The GPS receiver processes the approximate clock time, its approximate location, and the almanac or ephemeris information to determine which of the GPS satellites should be in-view; and generates one or more local GPS signals having carrier frequencies and pseudorandom noise (PRN) codes matching the estimated Doppler-shifted frequencies and the PRN codes of one or more of the in-view GPS satellites. The GPS receiver mixes the incoming GPS signal to a Doppler-shifted baseband; correlates the baseband with the PRN code and a PRN code phase of the local GPS signal; and then accumulates the correlations. The process of correlation and accumulation may need to be repeated many times until a correlation level is found that exceeds a correlation threshold indicating GPS signal acquisition.

When signal acquisition is achieved the GPS receiver monitors the GPS data bits until a hand over word (HOW) at the start of the subframe is recognized. The GPS receiver reads time of week (TOW) in the GPS data bits in the HOW to learn a GPS-based clock time accurate to about 20 milliseconds. A current precise location-in-space of the GPS satellite is then calculated from the GPS-based clock time and the ephemeris information. The code phase and data bit transition time of the local GPS signal is then used to calculate a pseudorange between the location of the GPS receiver and the location-in-space of the GPS satellite. Typically, the ephemeris information is retained in memory in the GPS receiver from a previous operational mode or is determined by reading additional GPS data bits. The geographical location fix is derived by linearizing the pseudorange about the range between the location-in-space of the GPS satellite and the approximate location of the GPS receiver and then solving four or more simultaneous equations having the locations-in-space and the linearized pseudoranges for four or more GPS satellites.

The global positioning system is commonly used for determining geographical location and/or time in commercial applications for navigation, timing, mapping, surveying, machine and agricultural control, vehicle tracking, and marking locations and time of events. Given such wide commercial application, it is clear that GPS receivers provide a good value for many users. However, the global positioning system has been limited in several potential applications because existing GPS receivers are unable to process a GPS signal unless the GPS signal has a relatively clear line of sight to the GPS satellites ensuring strong GPS signals. Typically, this is not a problem where the GPS receiver is mounted on a platform such as a ship, airplane, farm tractor, or a vehicle traveling on an open highway. However, the signal strength requirements of GPS receivers make it difficult to use GPS indoors or where the GPS signal may be weak due to the attenuation of passing through buildings or trees.

In order to increase the strength and signal-to-noise ratio of the GPS signal within the GPS receiver, it would be desirable to increase the processing gain above the standard processing gain that occurs by despreading a single epoch of the 1 ms PRN code. For example, a theoretical additional processing gain for integrating (correlating and accumulating) two coherent epochs is $10 \log_{10} 2 = 3$ decibels (dB) and the additional processing gain for one-hundred coherent epochs is $10 \log_{10} 100 = 20$ decibels (dB). It would seem that one could increase the number of despread epochs indefinitely until enough processing gain is achieved for overcoming the GPS signal attenuation caused by buildings and trees.

However, every 20 ms the C/A PRN code may be inverted with a new GPS data bit. Even after GPS signal power is acquired by determining the Doppler frequency shift of the carrier and phase of the code of the incoming signal are known, unless the timing of the data bits is known the new data bit may invert the correlations at any integer millisecond, thereby nullifying the processing gain for integration times beyond the 1 ms PRN code time period. Accordingly, there is a need for determining the transition times of the GPS data bits in order to provide the processing gain for receiving low level GPS and other direct sequence spread spectrum GPS signals.

SUMMARY OF THE INVENTION

It is therefore an object of the present invention to provide a method and apparatus for determining timing of data bit transitions in a direct sequence spread spectrum signal after frequency and code phase of the signal are known.

Briefly, in a preferred embodiment, a signal receiver of the present invention uses "N" assumptions for data bit transitions for determining N separate integrations, respectively, of an incoming spread spectrum signal, where N is the data bit time period of the signal divided by the time period of the spreading code. For an example case of a GPS signal receiver, the data bit time period is 20 milliseconds (ms), the spread code time period is 1 ms, and N is 20. In a first variation, the receiver uses N start times separated by time lengths equal to the time period of the code for integrating the incoming signal over time periods equal to the data bits. In a second variation, the signal receiver uses N sign inversion times separated by time lengths equal to the time period of the code for inverting the accumulation of the incoming signal during time periods equal to the data bits. In either variation the absolute (unsigned) values of the N integrations may be combined for several data bit time periods for providing N multibit integrations, respectively. The assumed transition timing that results in the largest of the N integrations is indicative of the timing of the data bit transitions. The data bit transition timing is then used for integrating the incoming signal over time lengths of a data bit for determining the sense of the data bit and integrating the incoming signal for up to several data bit time periods for acquiring and tracking the signal without having the nullifying effect of inversions of the data bits.

An advantage of the present invention is that a data bit transitions can be determined for weak incoming signals.

These and other objects and advantages of the present invention will no doubt become obvious to those of ordinary skill in the art after having read the following detailed description of the preferred embodiments which are illustrated in the various figures.

IN THE DRAWINGS

DETAILED DESCRIPTION OF THE PREFERRED EMBODIMENTS

Figure 1:
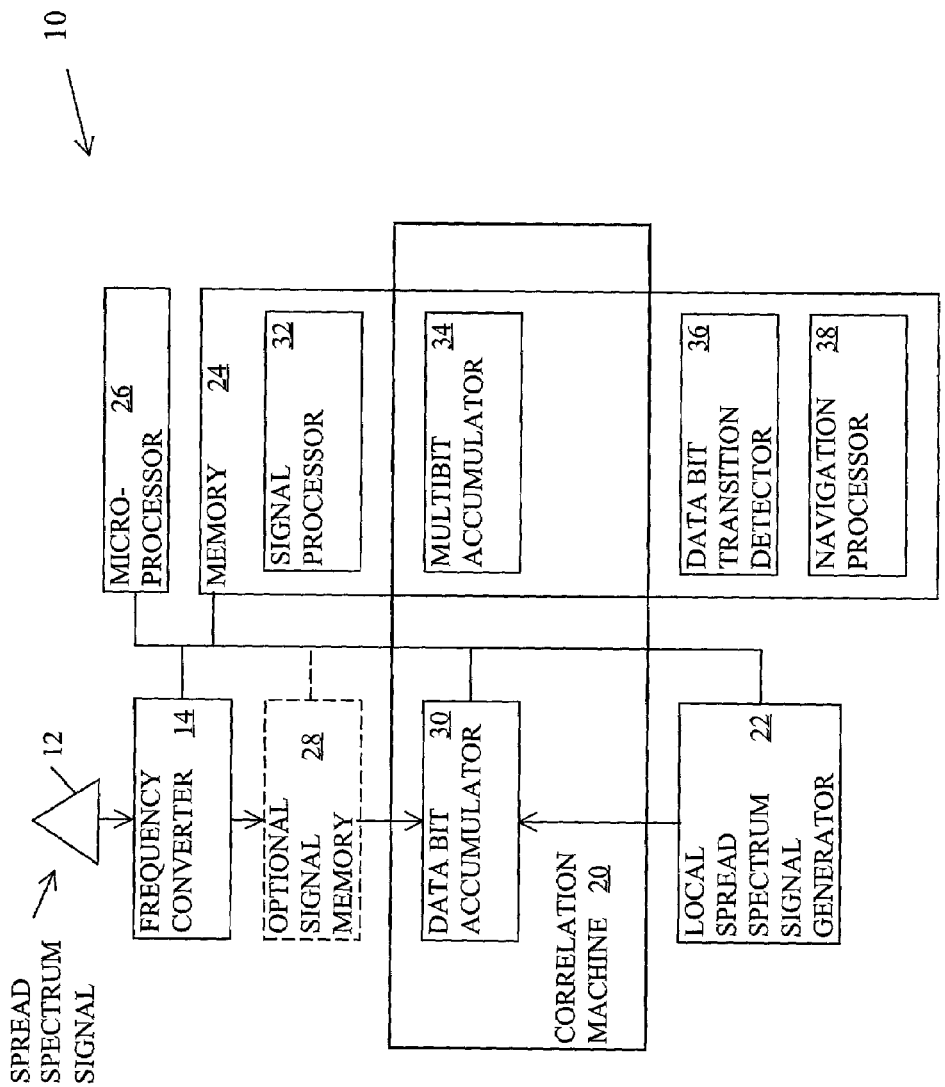
FIG. 1 is a block diagram of a spread spectrum signal receiver of the present invention.

FIG. 1 illustrates a block diagram of a spread spectrum signal receiver of the present invention referred to by a general reference number 10 for receiving an incoming spread spectrum signal. The spread spectrum signal has a carrier frequency modulated by data bits that are modulated by a spreading code that repeats several times for each data bit. As described below, the receiver 10 is adapted for receiving the coarse/acquisition (C/A) code GPS signal. However, it will be apparent to those skilled in the art that the present invention can be applied for receiving other direct sequence spread spectrum signals for two way and CDMA radio communication, P or P(Y) code GPS, GLO-NASS, and the like.

The receiver 10 includes an antenna 12, a frequency converter 14, a correlation machine 20, a local spread spectrum signal generator 22, a memory 24, and a microprocessor 26. The antenna 12 receives the incoming spread spectrum signal and converts the signal from an airwave to a conducted form. The frequency converter 14 downconverts the frequency of the conducted incoming signal and provides real time in-phase (I) and quadrature phase (Q) sampled signals to the correlation machine 20. In an optional embodiment, the receiver 10 also includes a signal memory 28 for receiving and storing the incoming real time sampled I and Q signals and the correlation machine 20 operates on the I and Q samples that have been stored.

The local generator 22 generates a local spread spectrum signal in the same format as the I and Q samples of the incoming spread spectrum signal. The correlation machine 20 includes a data bit accumulator 30 for providing integrations for the correlation and accumulation of the incoming I and Q samples with respect to the local signal for time lengths equal to the data bit time period as diagrammed in the time charts of FIGS. 3A–B and described in the accompanying detailed descriptions below. In a preferred embodiment the data bit accumulator 30 provides "N" separate integrations of an incoming spread spectrum signal in parallel. In an alternative embodiment, the N separate integrations are provided serially using N sequential time periods, each equal to the data bit time period. Preferably, N is equal to the data bit time period of the signal divided by the time period of the spreading code. However, in alternative embodiments N may be another number as low as two.

For the C/A code GPS signal, a preferred "N" is twenty (20) for the 20 ms of the data bit time period divided by the 1 ms of the code time period. In alternative embodiments, N may be another number such as ten (10) for the 20 ms of the GPS data bit time period divided by 2 ms for two of the 1 ms code time periods or five (5) for the 20 ms of the GPS data bit time period divided by 4 ms for four of the 1 ms code time periods or four (4) for the 20 ms of the GPS data bit time period divided by 5 ms for five of the 1 ms code time periods or two (2) for the 20 ms of the GPS data bit time period divided by 10 ms for ten of the 1 ms code time periods.

The memory 24 includes a signal processor 32, a multibit accumulator 34, a data bit transition detector 36, and a navigation processor 38. The microprocessor 26 including accessory hardware reads the programmed instructions and data, and writes data to the memory 24 in a conventional manner for controlling the elements of the receiver 10. The signal processor 32 includes data and program instructions for closing carrier and code loops with the correlation machine 20 and local generator 22 for acquiring and tracking the incoming signal. The multibit accumulator 34 is a part of the correlation machine 20 having data and programmed instructions using information from the data bit accumulator 30 for determining integrations, denoted $INT_1$ through $INT_N$ in FIGS. 3A–B, for one or more data bit time periods.

The data bit transition detector 36 uses the relative strengths of the integrations $INT_1$ through $INT_N$ for determining the timing of the data bit transitions of the incoming signal. The navigation processor 38 uses information from the correlation machine 20, the signal processor 32 and the data bit transition detector 36 for determining the information in the data bits, and determining location and velocity of the antenna 12. It is understood by those skilled in the art that the boundaries between the program instructions and data for the signal processor 32, the multibit accumulator 34, the data bit transition detector 36, and the navigation processor 38 may not be easily distinguishable within the memory 24.

The data bit accumulator 30 in a preferred embodiment is a custom or programmable gate array or digital signal processing integrated circuit and the memory 24 is electronic integrated circuits for standard read only memory (ROM, PROM, flash, or the like) having custom programmed instructions and standard random access memory (RAM, flash, or the like) having variable data. Of course, other types of memory devices can be used for the memory 24 such as magnetic memories of various types in combination with or in place of the electronic integrated circuit devices.

Figure 2A:
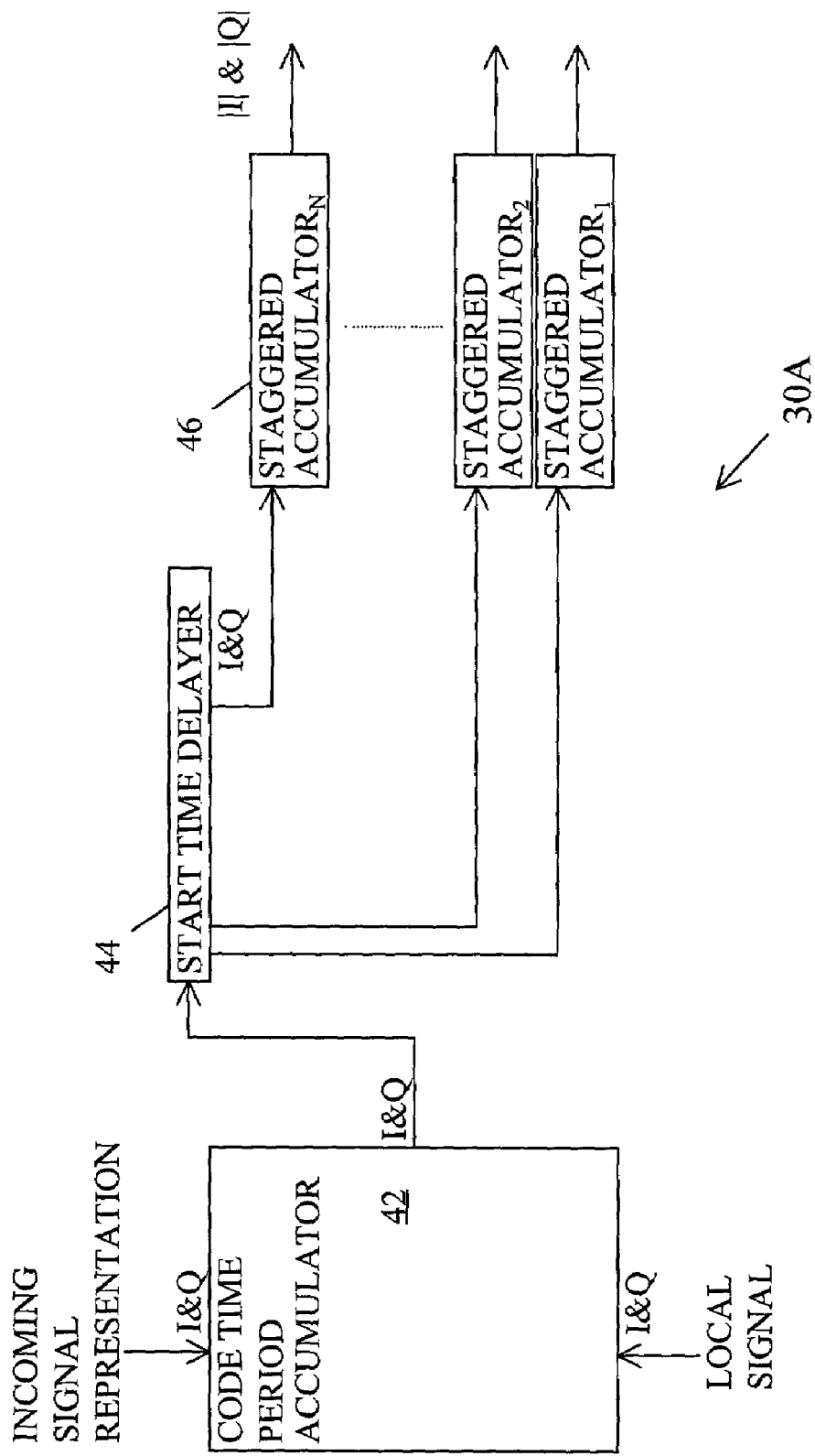
FIG. 2A is a block diagram of an embodiment of a correlation machine for the receiver of FIG. 1.
Figure 3A:
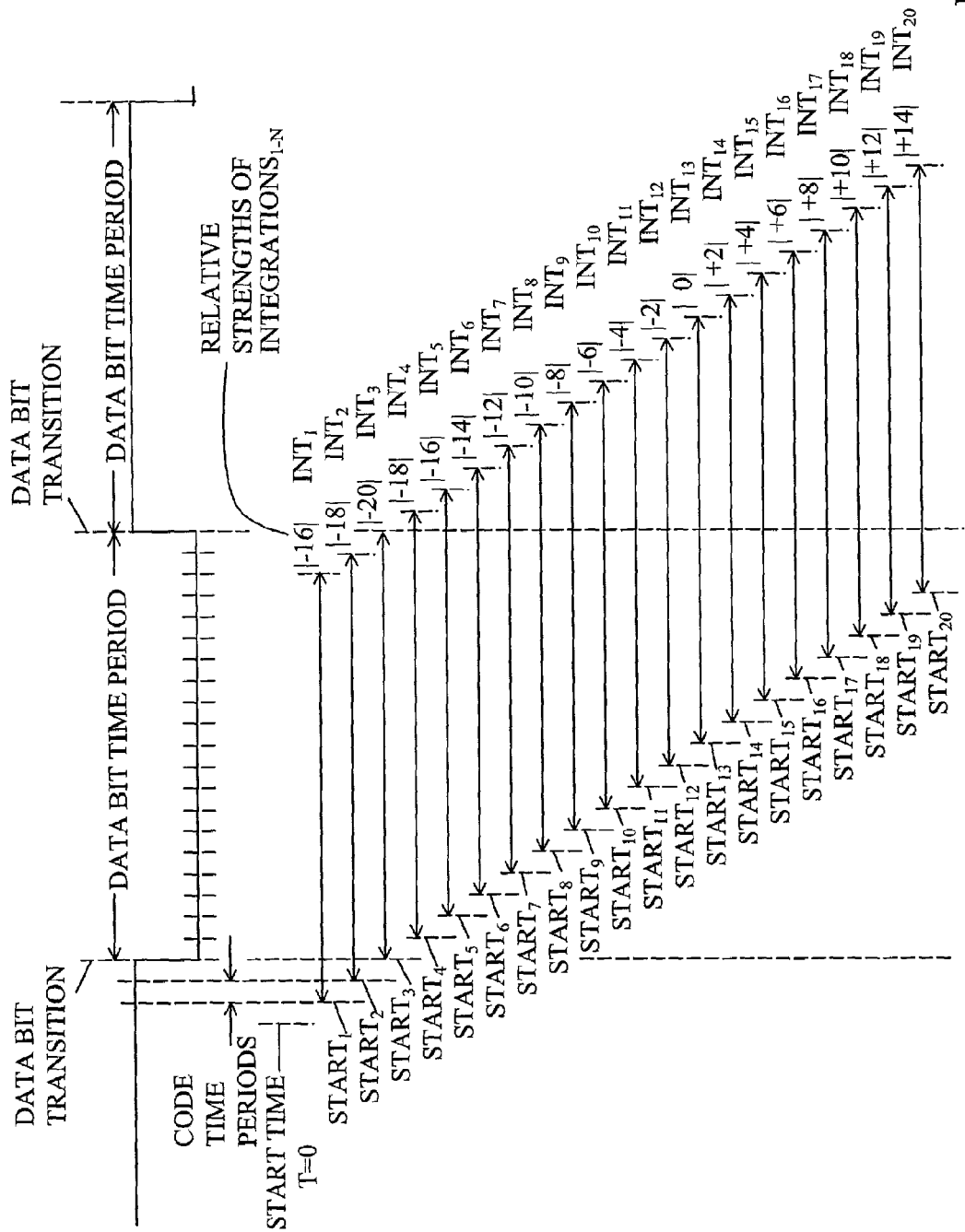
FIG. 3A is a time chart showing variable start times for the correlation machine of FIG. 2A.

FIG. 2A is a block diagram of an embodiment of the data bit accumulator 30 of the present invention referred to with a reference identifier 30A for providing absolute values (unsigned values) of I and Q accumulations for accumulation time periods equal to the data bit time period. The unsigned values are then processed according to instructions in the multibit accumulator 34 for determining integrations $INT_1$ through $INT_N$ (FIG. 3A). The data bit accumulator 30A includes a code time period accumulator 42, start time delayer 44, and staggered data bit period accumulators$_{S-N}$ 46. A time chart of the operation of the receiver 10 for N equals twenty with the data bit accumulator 30A is shown in FIG. 3A and described in the accompanying detailed description.

The code time period accumulator 42 provides I and Q code accumulations of the correlation between I and Q components of the local spread spectrum signal from the local generator 22 and I and Q components of the representation of the incoming signal samples from the frequency downconverter 14 (or signal memory 28) in repetitive time periods of the spreading code of the incoming signal. In a numerical example, the samples have a period of 400 nanoseconds and the C/A code of the GPS signal has a time period of 1 millisecond (ms) so there are 2500 I correlations and 2500 Q correlations for each code time period. The code time period accumulator 42 accumulates the 2500 I correlations into a code accumulated I and accumulates the 2500 Q correlations into a code accumulated Q.

The code accumulated I and Q are delayed by one through N code accumulation time periods by the start time delayer 44 for providing one through N delayed I and Q code accumulations, respectively, to the one through N staggered accumulators$_{1-N}$ 46, respectively. In other words, the code accumulated I and Q is delayed by one code accumulation time period and passed to the first staggered accumulator$_1$ 46, the code accumulated I and Q is delayed by two code accumulation time periods and passed to the second staggered accumulator$_2$ 46, and so on until the code accumulated I and Q is delayed by N code accumulation time periods and passed to the Nth staggered accumulators 46. In a first embodiment the code accumulation time period is one code time period (N= 20 for C/A GPS); in a second embodiment the code accumulation time period is two code time periods (N=10 for C/A GPS); and so on.

The staggered accumulators$_{1-N}$ 46 accumulate the one through N delayed I and Q code accumulations for a data bit time period for determining one through N I and Q data bit accumulations, respectively. Continuing the numerical example above for N=20, each of the one through 20 I data bit accumulations includes 20 times 2500=50,000 I correlations and each of the one through 20 Q data bit accumulations includes 20 times 2500=50,000 Q correlations. Then, the one through N staggered accumulators$_{1-N}$ 46 ignore the sign (take absolute values) of the one through N I and Q data bit accumulations for providing one through N sets of |I| and |Q| unsigned accumulation values, respectively. The one through N sets of |I| and |Q| unsigned accumulation values are processed by the multibit accumulator 34 for determining $INT_1$ to $INT_N$, respectively.

Figure 2B:
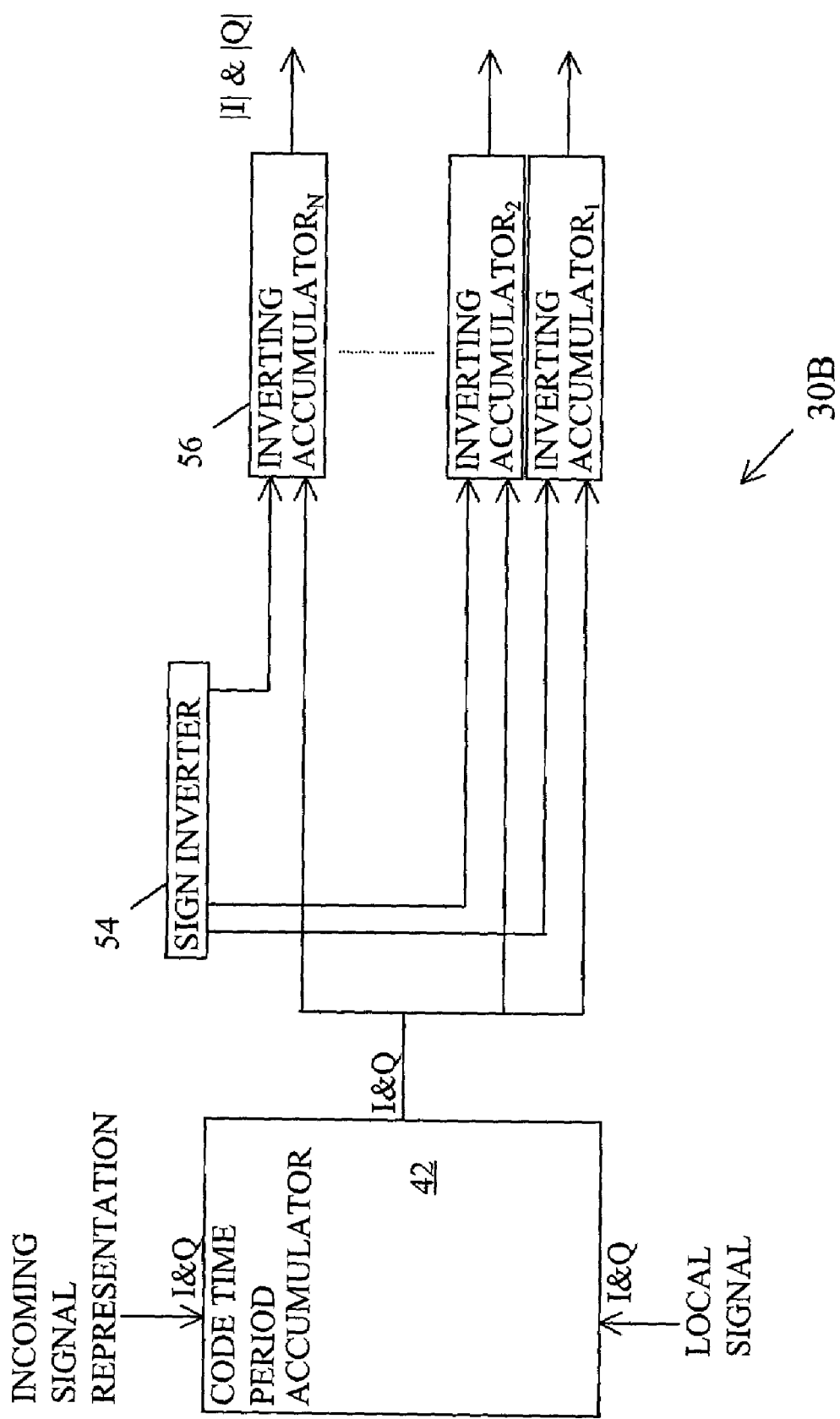
FIG. 2B is a block diagram of another embodiment of a correlation machine of the receiver of FIG. 1.
Figure 3B:
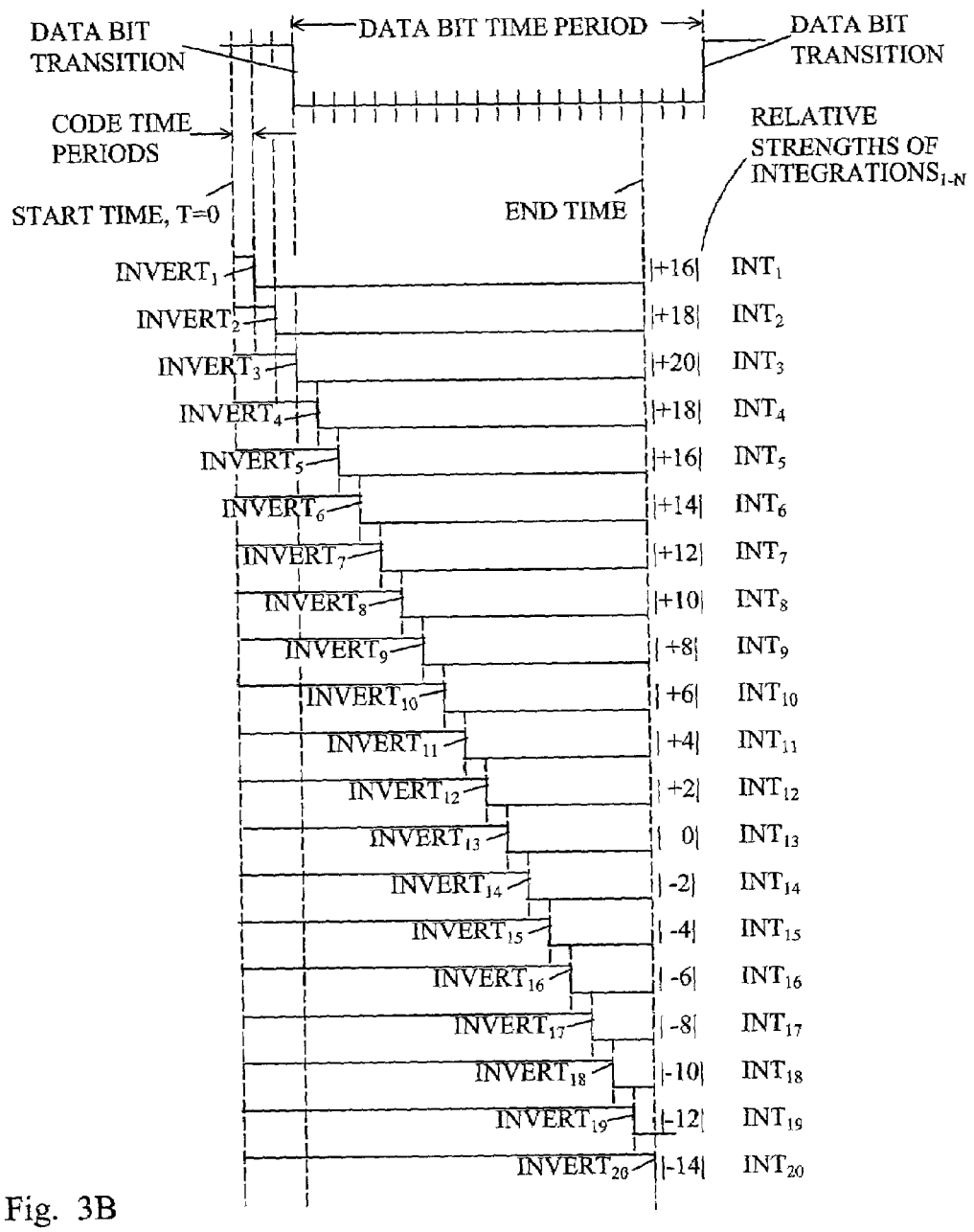
FIG. 3B is a time chart showing variable sign inversion times for the correlation machine of FIG. 2B.

FIG. 2B is a block diagram of an embodiment of the data bit accumulator 30 of the present invention referred to with a reference identifier 30B for providing absolute values (unsigned values) of I and Q correlations for accumulation time periods equal to the data bit time period. The unsigned values are then processed according to instructions in the multibit accumulator 34 for determining integrations $INT_1$ through $INT_N$ (FIG. 3B). The data bit accumulator 30B includes the code time period accumulator 42, a sign inverter 54, and inverting data bit period accumulators$_{S-N}$ 56. A time chart of the operation of the receiver 10 for N equals twenty with the data bit accumulator 30B is shown in FIG. 3B and described in the accompanying detailed description. The code time period accumulator 42 operates as described above in the description accompanying FIG. 2A.

The sign inverter 54 provides one through N sign invert signals at one through N code accumulation time periods, respectively, after a start time. The one through N sign invert signals are received by the one through N inverting accumulators$_{1-N}$ 56, respectively. In other words, the first sign invert signal is passed to the first inverting accumulator$_1$ 56 at a delay of one code accumulation time period from the start time, the second sign invert signal is passed to the second inverting accumulator$_2$ 56 at a delay of two code accumulation time periods from the start time, and so on until the Nth sign invert signal is passed to the Nth inverting accumulator$_N$ 56 at a delay of N code accumulation time periods from the start time. Because the data bit period actually is N code accumulation time periods, the Nth signal invert signal is not required.

The one through N inverting accumulators$_{1-N}$ 56 accumulate the one through N code accumulated I and Q, respectively, in a positive way before receiving the sign invert signal and in a negative way after receiving the signal invert signal for a data bit time period for measuring the one through N I and Q data bit accumulations, respectively. In other words the first inverting accumulator$_1$ 56 adds positive code accumulated I and Q before receiving the first data invert signal to negative code accumulated I and Q after receiving the first data invert signal; the second inverting accumulator$_2$ 56 adds positive code accumulated I and Q before receiving the second data invert signal to negative code accumulated I and Q after receiving the first data invert signal; and the Nth inverting accumulator$_N$ 56 adds all positive code accumulated I and Q.

Then, the inverting accumulators$_{1-N}$ 56 ignore the sign (take absolute values) of the one through N I and Q data bit accumulations for providing one through N sets of |I| and |Q| unsigned accumulation values, respectively. The one through N sets of |I| and |Q| unsigned accumulation values are processed by the multibit accumulator 34 for determining $INT_1$ to $INT_N$, respectively.

Returning to FIG. 1, the multibit accumulator 34 processes the one through N sets of |I| and |Q| unsigned accumulation values from the correlation machine 20 for one or more data bit time periods for providing one through N integrations $INT_1$ to $INT_N$, respectively. For a single data bit time period, the one through N integrations $INT_1$ to $INT_N$ are one through N of $|I|^2+|Q|^2$, respectively. For example, an Mth integration $INT_M$ equals $|I_M|^2+|Q_M|^2$ where $I_M$ and $Q_M$ are the Mth one of the one through N I and Q data bit accumulations.

For processing multiple data bit time periods the multibit accumulator 34 preferably combines the first through Nth unsigned accumulation values for all of the data bit periods for providing first through Nth multibit unsigned accumulation values, respectively. In other words, the first |I| unsigned accumulation values for all of the data bit time periods are accumulated or summed to determine the first |I| multibit unsigned accumulation value, the second |I| multibit unsigned accumulation values for all of the data bit time periods are accumulated or summed to determine the second |I| multibit unsigned accumulation value, and so on through the Nth |I| unsigned accumulation values. Similarly, the first |Q| unsigned accumulation values for all of the data bit time periods are accumulated or summed to determine the first |Q| multibit unsigned accumulation value, the second |Q| multibit unsigned accumulation values for all of the data bit time periods are accumulated or summed to determine the second |Q| multibit unsigned accumulation value, and so on through the Nth |Q| unsigned accumulation values.

For K data bit time periods, all K first $|I_1|$ unsigned accumulation values are summed for forming a summed first $|I_1|$ unsigned accumulation value denoted as $\Sigma_{1-K}|I_1|$, and all K first $|Q_1|$ unsigned accumulation values are summed for forming a summed first $|Q_1|$ unsigned accumulation value denoted as $\Sigma_{1-K}|Q_1|$, and so on until all K Nth $|I_N|$ unsigned accumulation values are summed for forming a summed Nth $|I_N|$ unsigned accumulation value denoted as $\Sigma_{1-K}|I_N|$; and all K Nth $|Q_N|$ unsigned accumulation values are summed for forming a summed Nth $|Q_N|$ unsigned accumulation value denoted as $\Sigma_{1-K}|Q_N|$. The one through N integrations $INT_1$ through $INT_N$ are $[(\Sigma_{1-K}|I_1|)^2 + (\Sigma_{1-K}|Q_1|)^2]$ through $[(\Sigma_{1-K}|I_N|)^2 + (\Sigma_{1-K}|Q_N|)^2]$, respectively. Although the one through N integrations $INT_1$ to $INT_N$ are preferred as squared functions as described above, alternative embodiments for the first through Nth integrations $INT_1$ through $INT_N$ can be squared functions $[\Sigma_{1-K}(|I_1|+|Q_1|)^2]$ through $[\Sigma_{1-K}(|I_N|+|Q_N|)^2]$; linear functions of |I| and |Q| such as $[\Sigma_{1-K}(|I_1|+|Q_1|)^2]$ through $[\Sigma_{1-K}(|I_N|+|Q_N|)]$, or $[\Sigma_{1-K}|+I_1|+\Sigma_{1-K}|Q_1|)]$ through $[\Sigma_{1-K}|I_N|+\Sigma_{1-K}|Q_N|]$, $[\Sigma_{1-K}|I_1+Q_1|]$ through $[\Sigma_{1-K}|I_N+Q_N|]$; and square roots of the sum of the squared functions $[((\Sigma_{1-K}|I_1|)^2+\Sigma_{1-K}|Q_1|)^2)^{(1/2)}]$ through $[((\Sigma_{1-K}|I_N|)^2+(\Sigma_{1-K}|Q_N|)^2)^{(1/2)}]$.

Multiple data bit time periods may also be processed in a histogram method. For each data bit time period, the multibit accumulator 34 determines which one of the first through Nth unsigned accumulation values is the largest. A hit is given to the one of the first through Nth assumed data bit transition times that resulted in the largest one of the first through Nth unsigned accumulation values. The first through Nth integrations $INT_1$ to $INT_N$ are taken as the respective numbers of hits for the first through Nth assumed data bit transition times.

For example, for fifty data bit time periods the first through Nth integrations $INT_1$ to $INT_N$ as measured by the number of hits for the first through 20th assumed data bit transition times might be 1, 3, 20, 5, 1, 2, 1, 1, 1, 0, 1, 0, 2, 1, 1, 0, 1, 1, 2, 6. In this example the third integration $INT_3$ is the largest. And, the assumed data bit transition timing that resulted in the third integration $INT_3$ is used as the basis for determining the actual data bit transition timing.

FIG. 3A is a time line showing the operation of the receiver 10 using the correlation machine 20 having the data bit accumulator 30A. The incoming signal may or may not have data bit transitions separating data bit time periods depending upon whether the polarity of the data bit changes. The repetitive data bit time period can be segmented into N repetitive code accumulation time periods. For the C/A GPS and N equals 20, the data bit accumulator 30A accumulates in data bit time periods having 20 staggered start times $START_1$ through $START_{20}$ and the first start time $START_1$ is delayed by one code time period from t=0 start time and each start time $START_2$ through $START_{20}$ after that is progressively delayed by one more code time period.

The relationship of the nearest data bit transition to the time of the $START_1$ is an unknown in increments of one code time period until it is determined as an object of the present invention. FIG. 3A illustrates the time chart with $START_1$ two code time periods before the nearest data bit transition, $START_3$ aligned with the data bit transition (although this is not known until it is determined), and $START_{20}$ 17 code time periods after the nearest data bit transition to the $START_1$.

The relative strengths of the integrations $INT_1$ to $INT_{20}$ show the relative alignments corresponding to the $START_1$ to $START_{20}$ respectively. For example for the $START_1$ two units of positive polarity combine with 18 units of negative polarity for the integration $INT_1$ equal to |−16| or 16 units. For the $START_{20}$ three units of negative polarity combine with 17 units of positive polarity for the integration $INT_{20}$ equal to 14 units. The integration $INT_3$ associated with the $START_3$ is the strongest at |−20| or 20 units, thereby indicating that the $START_3$ is aligned with the data bit transition.

FIG. 3B is a time line showing the operation of the receiver 10 using the correlation machine 20 having the data bit accumulator 30B. The incoming signal may or may not have data bit transitions separating data bit time periods depending upon whether the polarity of the data bit changes. The repetitive data bit time period can be segmented into N repetitive code accumulation time periods. The correlation machine 20B correlates and accumulates in accumulation time periods starting at a start time t=0 and ending at an end time. For the C/A GPS signal and N equals 20, the correlation machine 20B correlates and accumulates in data bit time periods having 20 staggered sign invert times $INVERT_1$ through $INVERT_{20}$. The first invert time $INVERT_1$ is delayed by one code time period from t=0 start time and each invert time $INVERT_2$ through $INVERT_{20}$ after that is progressively delayed by one more code time period.

The relationship of the nearest data bit transition to the time of the $INVERT_1$ is an unknown in increments of one code time period until it is determined as an object of the present invention. FIG. 3B illustrates the time chart with $INVERT_1$ two code time periods before the nearest data bit transition, the sign invert signal $INVERT_3$ is aligned with the data bit transition (although this is not known until it is determined), and $INVERT_{19}$ 16 code time periods after the nearest data bit transition to the $INVERT_1$. The $INVERT_{20}$ inversion is not actually required because the sign invert time occurs at the end of the data bit time period.

The relative strengths of the integrations $INT_1$ to $INT_{20}$ show the relative alignments corresponding to the $INVERT_1$ to $INVERT_{20}$, respectively. For example for the $INVERT_1$ one unit of positive polarity, two units of negative polarity, and 17 units of positive polarity combine for the integration $INT_1$ equal to 16 units. For the $INVERT_{20}$ three units of positive polarity combine with 17 units of negative polarity for the integration $INT_{20}$ equal to |−14| or 14 units. In FIG. 3B the integration $INT_3$ associated with the $INVERT_3$ is the strongest at 20 units, thereby indicating that the $INVERT_3$ is aligned with the data bit transition.

Figure 4A:
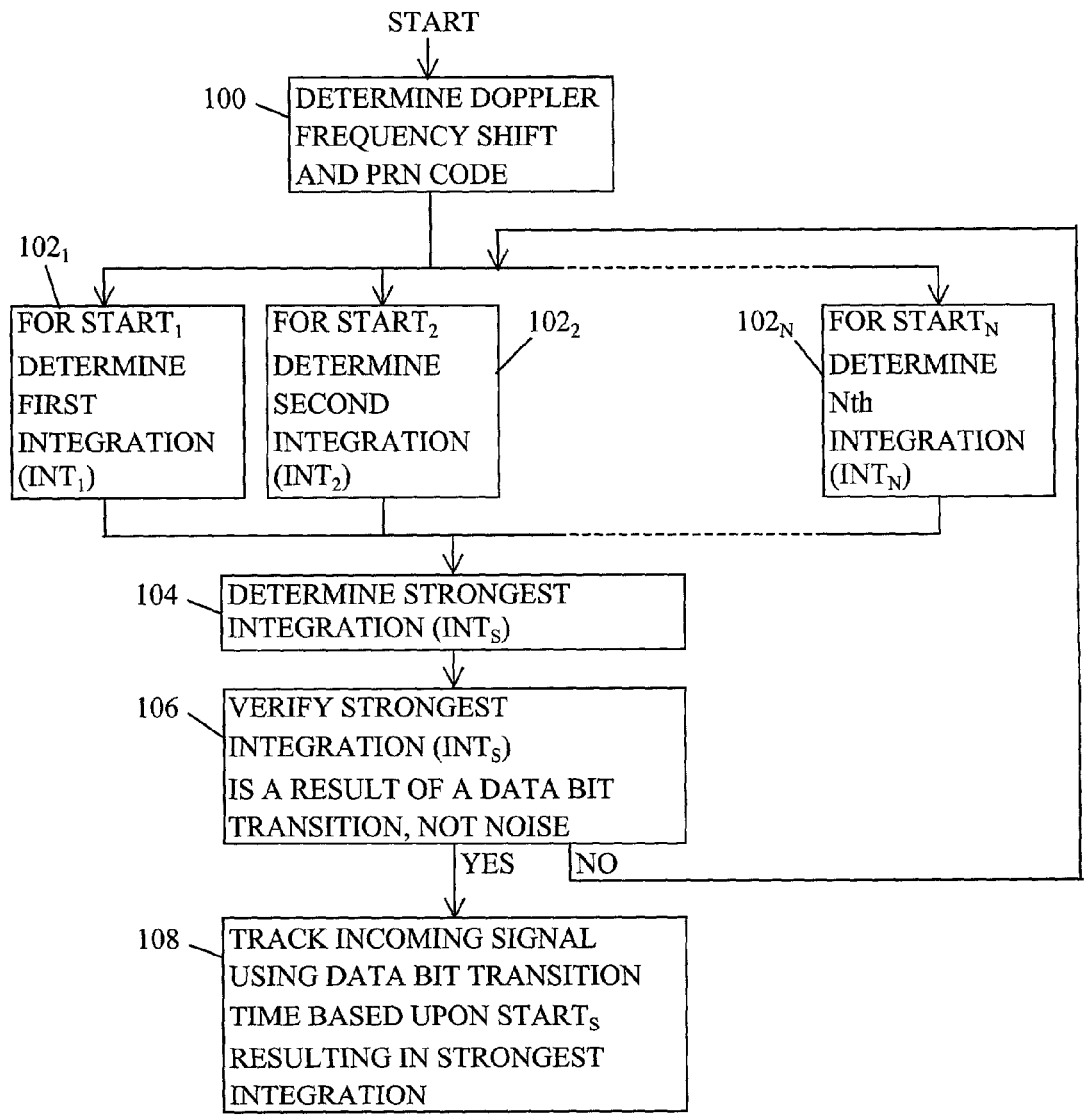
FIG. 4A is a flow chart of a method for receiving a spread spectrum signal using the correlation machine of FIG. 2A.

FIG. 4A is a flow chart of the operation of the receiver 10 using the correlation machine 20 having the data bit accumulator 30A. In a step 100, the receiver 10 determines the Doppler modified frequency and PRN code phase for a GPS signal source. Most commonly the GPS signal source is a GPS satellite, however, the GPS signal source can also be a GPS pseudolite. Then, in steps $102_1$ to $102_N$ the receiver 10 determines first through Nth integrations $INT_1$ to $INT_N$, respectively, as illustrated in FIGS. 2A and 3A described above in the accompanying detailed descriptions.

Steps 104, 106, and 108 are implemented by the microprocessor 26 as directed by the programmed instructions in the data bit transition detector 36. In the step 104 the strongest one of the integrations $INT_1$ to $INT_N$, denoted by $INT_S$, is determined. In a step 106 the strongest integration $INT_S$ is tested to determine that it is a result from a transition between two polarities of the data bits and not noise or a segment of the signal having no transitions. This step is normally not required when the number of data bit time periods in a multibit accumulation is much greater than the number of consecutive ones or zeros allowable for the incoming signal.

For only one or a small number of data bit periods a test is made in the step 106 to verify the strongest integration $INT_s$ is a result of signal. Preferably, the general shape of a graph of the amplitudes of the first through Nth integrations $INT_1$ to $INT_N$ is reviewed to see that the integrations before and after the strongest integration $INT_S$ show a pattern increasing to the strongest integration $INT_S$. For example, the strongest integration $INT_S$ should be larger than the integrations further before and after the strongest integration $INT_S$, ($INT_{S-1}>INT_{S-2}$ and $INT_{S+1}>INT_{S+2}$). where the integration $INT_{S-1}$ starts one code time period before and the integration $INT_{S-2}$ starts two code time periods before the integration $INT_S$; and the integration $INT_{S+1}$ starts one code time period after and the integration $INT_{S+2}$ starts two code time periods after the integration $INT_S$.

Referring back to FIG. 3A, the integration $INT_{S-2}$ is the integration $INT_1$, the integration $INT_{S-1}$ is the integration $INT_2$, the strongest integration $INT_S$ is the integration $INT_3$, the integration $INT_{S+1}$ is the integration $INT_4$, and the integration $INT_{S+2}$ is the integration $INT_5$. Therefore, the timing of the STARTS corresponding to the strongest integration $INT_S$ indicates the timing of the data bit transitions. When the peak of the pattern does not exceed a relative threshold, the receiver 10 reverts back to the step 104 to make a new determination of the strongest integration $INT_S$. When the strongest integration $INT_S$ is determined to be a result of signal, the receiver 10 then uses the timing of the data bit transitions for determining the breaks in the integration period for determining unsigned (absolute) values when integrating the incoming signal as described above. In a step 108 the microprocessor 26 implements the programmed code in the navigation processor 38 for using the integrations of the incoming signal for determining the polarities of the data bits and determining the location and velocity of the antenna 12.

Figure 4B:
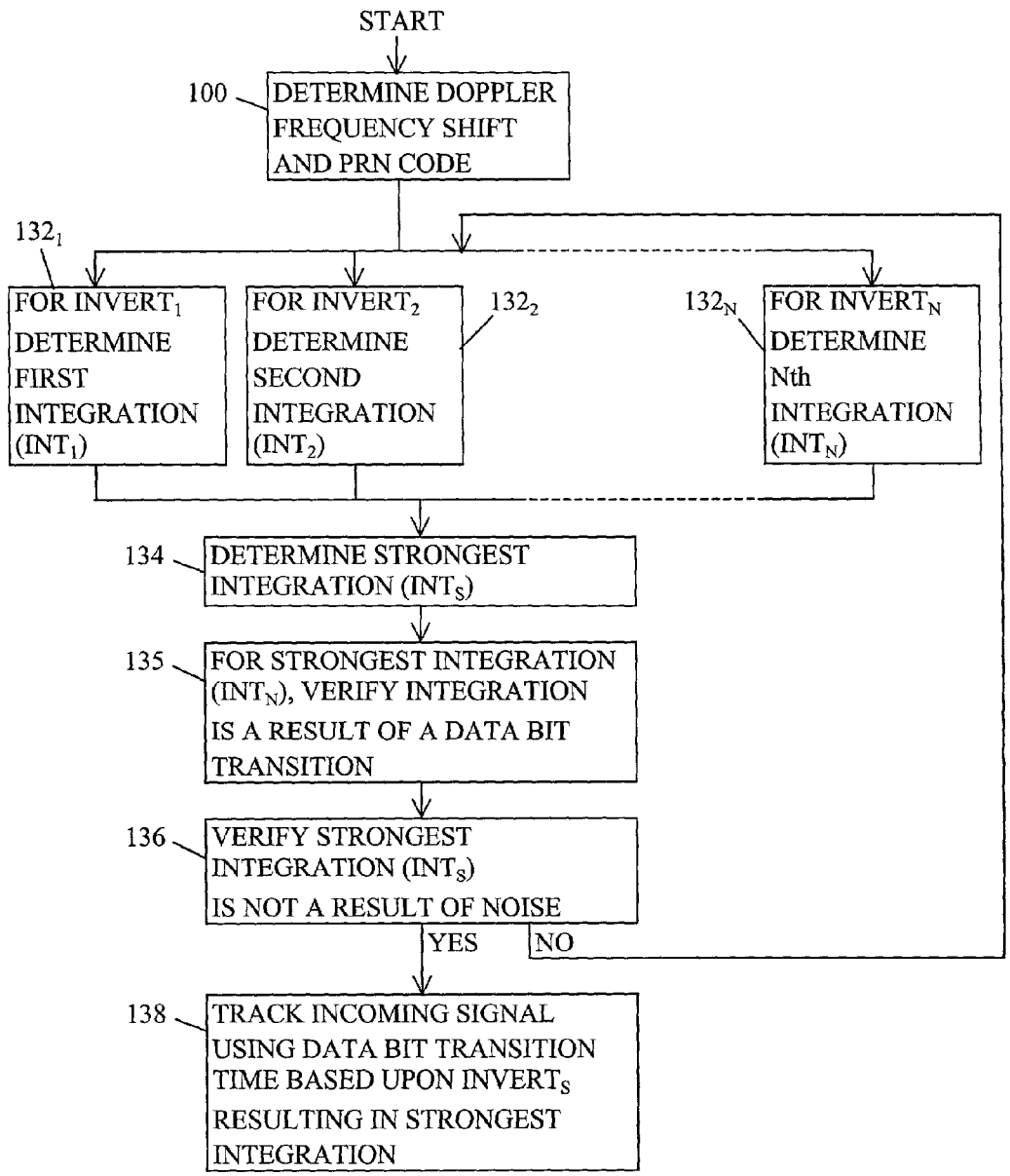
FIG. 4B is a flow chart of a method for receiving a spread spectrum signal using the correlation machine of FIG. 2B.

FIG. 4B is a flow chart of the operation of the receiver 10 using the correlation machine 20 having the data bit accumulator 30B. In a step 100, the receiver 10 determines the Doppler modified frequency and PRN code phase for a GPS signal source. Most commonly the GPS signal source is a GPS satellite, however, the GPS signal source can also be a GPS pseudolite. Then, in steps 132, to $^{132}N$ the receiver 10 determines first through Nth integrations $INT_1$ to $INT_N$, respectively, as illustrated in FIGS. 2B and 3B described above in the accompanying detailed descriptions.

Steps 134, 135, 136, and 138 are implemented by the microprocessor 26 as directed by the programmed instructions in the data bit transition detector 36 for the timing of the data bit transition as described above. In the step 134 the strongest one of the integrations $INT_1$ to $INT_N$, denoted by $INT_S$, is determined.

Referring back to FIG. 3B it may be seen by inspection that when there are no transitions, the integration $INT_N$ (N= 20 in the FIG. 3B) corresponding to the timing of the $INVERT_N$ would be the strongest integration. In general, when the integration $INT_N$ is the strongest integration, denoted as the integration $INT_S$, then in a step 135 the integration $INT_N$ is subjected to further evaluation. In a first embodiment, when there are two peaks in the graph for the first through Nth integrations $INT_1$ to $INT_N$ the peak that does not correspond to the integration $INT_N$ is considered to be the strongest integration. In a second embodiment a selectable delay is inserted so that actual data bit transitions move away from the timing of the $INVERT_N$. When the $INVERT_N$ continues to provide a singular peak as the strongest integration $INT_S$, the receiver 10 assumes that the $INT_S$ is due to noise or a long period where no data bit transition is present in the incoming signal.

Returning to FIG. 4B, in a step 136 the strongest integration $INT_S$ is tested to determine that it is a result of signal and not noise. This step is normally not required when the number of data bit time periods in a multibit accumulation is much greater than the number of consecutive ones or zeros allowable for the incoming signal. For only one or a small number of data bit periods a test is made in the step 136 to verify the strongest integration $INT_S$ is a result of signal. Preferably, the general shape of a graph of the amplitudes of the first through Nth integrations $INT_1$ to $INT_N$ is reviewed to see that the integrations before and after the strongest integration $INT_S$ show a pattern increasing to the strongest integration $INT_S$. For example, the strongest integration $INT_S$ should be larger than the integrations further before and after the strongest integration $INT_S$, ($INT_{S-1}>INT_{S-2}$ and $INT_{S+1}>INT_{S+2}$). where the integration $INT_{S-1}$ starts one code time period before and the integration $INT_{S-2}$ starts two code time periods before the integration $INT_S$; and the integration $INT_{S+1}$ starts one code time period after and the integration $INT_{S+2}$ starts two code time periods after the integration $INT_S$.

Referring to FIG. 3B again, the integration $INT_{S-2}$ is the integration $INT_1$, the integration $INT_{S-1}$ is the integration $INT_2$, the strongest integration $INT_S$ is the integration $INT_3$, the integration $INT_{S+1}$ is the integration $INT_4$, and the integration $INT_{S+2}$ is the integration $INT_5$. Therefore, the timing of the INVERTS corresponding to the strongest integration $INT_S$ indicates the timing of the data bit transitions. When the pattern does not exceed a relative threshold, the receiver 10 reverts back to the step 134 to make a new determination of the strongest integration $INT_S$. When the strongest integration $INT_S$ is determined to be a result of signal, the receiver 10 then uses the timing of the data bit transitions for determining the breaks in the integration period for determining unsigned (absolute) values when integrating the incoming signal as described above. In a step 138 the microprocessor 26 implements the programmed code in the navigation processor 38 for using the integrations of the incoming signal for determining the polarities of the data bits and determining the location and velocity of the antenna 12.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for determining data bit transition times for an incoming signal having data bits modulated by a known repeating code having a known code time period, said data bits having a known data bit time period, comprising:

integrating said incoming signal using staggered first through Nth assumed said data bit transition times for determining first through Nth unsigned accumulation values, respectively, for a plurality of accumulation time periods for each of said first through Nth assumed data bit transition times;

combining said first through Nth unsigned accumulation values for like ones of said first through Nth assumed data bit transition times for providing first through Nth integrations, respectively; and determining actual said data bit transition times from a certain one of said first through Nth assumed data bit transition times corresponding to a largest one of said first through Nth integrations.

2. The method of claim 1, wherein:
said N is about equal to said data bit time period divided by said code time period.

3. The method of claim 1, wherein:
each of said accumulation time periods is about equal to said data bit time period.

4. The method of claim 1, wherein:
integrating comprises accumulating during said accumulation time periods having staggered first through Nth start times for providing said first through Nth integrations, respectively, an Mth one of said start times later than an (M−1)th one of said start times by said data bit time period divided by said N.

5. A method for determining data bit transition times for an incoming signal having data bits modulated by a known repeating code having a known code time period, said data bits having a known data bit time period, comprising:
integrating said incoming signal using staggered first through Nth invert times for providing first through Nth integrations, respectively; and determining said data bit transition times from a certain one of said first through Nth invert times that results in a largest one of said first through Nth integrations, wherein:
integrating includes accumulating one of (i) positive and (ii) negative accumulations before said first through Nth invert times and the other of (i) positive and (ii) negative accumulations after said first through Nth invert times for one or more accumulation time periods for providing said first through Nth integrations.

6. The method of claim 5, wherein:
an Mth one of said invert times is later than an (M−1)th one of said invert times by said data bit time period divided by N.

7. The method of claim 1, wherein:
said actual data bit transition times are used for determining said data bits.

8. The method of claim 1, wherein:
said actual data bit transition times are used for tracking said incoming signal.

9. The method of claim 1, wherein:
said N is in a range between two and said data bit time period divided by said code time period, inclusively.

10. A method for determining data bit transition times for an incoming signal having data bits modulated by a known repeating code having a known code time period, said data bits having a known data bit time period, comprising:
integrating said incoming signal using first through Nth assumed said data bit transition times for determining first through Nth unsigned accumulation values, respectively, for accumulation time periods;

for each of said accumulation time periods, determining a largest of said first through Nth unsigned accumulation values;

determining a one of said first through Nth assumed data bit transition times that results in a largest number of largest said unsigned accumulation values; and determining actual said data bit transition times from said one of said first through Nth assumed data bit transition times that results in said largest number of largest said unsigned accumulation values.

11. An apparatus for determining data bit transition times for an incoming signal having data bits modulated by a known repeating code having a known code time period, said data bits having a known data bit time period, comprising:
a correlation machine for integrating said incoming signal using staggered first through Nth assumed said data bit transition times for determining first through Nth unsigned accumulation values, respectively, for a plurality of accumulation time periods for each of said first through Nth assumed data bit transition times; and combining said first through Nth unsigned accumulation values for like ones of said first through Nth assumed data bit transition times for providing first through Nth integrations, respectively; and a data bit transition detector for determining actual said data bit transition times from a certain one of said first through Nth assumed data bit transition times corresponding to a largest one of said first through Nth integrations.

12. The apparatus of claim 11, wherein:
said N is about equal to said data bit time period divided by said code time period.

13. The apparatus of claim 11, wherein:
each of said accumulation time periods is about equal to said data bit time period.

14. The apparatus of claim 11, wherein:
the correlation machine integrates during said accumulation time periods having staggered first through Nth start times for providing said first through Nth integrations, respectively, an Mth one of said start times later than an (M−1)th one of said start times by said data bit time period divided by said N.

15. The apparatus of claim 11, further comprising:
a navigation processor for using said actual data bit transition times for determining said data bits.

16. The apparatus of claim 11, further comprising:
a navigation processor for using said actual data bit transition times for tracking said incoming signal.

17. The apparatus of claim 11, wherein:
said N is in a range between two and said data bit time period divided by said code time period, inclusively.

18. A method for determining data bit transition times for an incoming signal having data bits modulated by a known repeating code having a known code time period, said data bits having a known data bit time period, comprising:
a correlation machine including a sign inverter for generating staggered first through Nth invert times and an inverting accumulator for using said first through Nth invert times for integrating an incoming signal for providing first through Nth integrations, respectively; and a data bit transition detector for determining said data bit transition times from a certain one of said first through Nth invert times corresponding to a largest one of said first through Nth integrations, wherein:
the correlation machine accumulates one of (i) positive and (ii) negative accumulations before said first through Nth invert times and the other of (i) positive and (ii) negative accumulations after said first through Nth invert times for one or more accumulation time periods for providing said first through Nth integrations.

19. The apparatus of claim 18, wherein:
an Mth one of said invert times is later than an (M−1)th one of said invert times by said data bit time period divided by said N.

20. An apparatus for determining data bit transition times for an incoming signal having data bits modulated by a known repeating code having a known code time period, said data bits having a known data bit time period, comprising:

a correlation machine for integrating said incoming signal using staggered first through Nth invert times corresponding to first through Nth assumed said data bit transition times for determining first through Nth unsigned accumulation values, respectively, for a plurality of accumulation time periods, respectively; and determining a one of said first through Nth assumed data bit transition times that results in a largest number of largest said unsigned accumulation values; and a data bit transition detector for determining actual said data bit transition times from said one of said first through Nth assumed data bit transition times that results in said largest number of largest said unsigned accumulation values.

* * * * *